United States Patent
Amitai et al.

(10) Patent No.: US 6,726,985 B2
(45) Date of Patent: Apr. 27, 2004

(54) SHOE SOLE

(76) Inventors: Nathan Amitai, 449 Ruckman Rd., Closter, NJ (US) 07624; Drahoslav Lim, 7110 Denison Pl., San Diego, CA (US) 92122; Sol Levine, 3929 McFarlin Blvd., Dallas, TX (US) 75205

(*) Notice: Subject to any disclaimer, the term of this patent is extended or adjusted under 35 U.S.C. 154(b) by 150 days.

(21) Appl. No.: 10/007,025

(22) Filed: Nov. 2, 2001

(65) Prior Publication Data

US 2002/0151242 A1 Oct. 17, 2002

Related U.S. Application Data

(60) Provisional application No. 60/245,541, filed on Nov. 3, 2000.

(51) Int. Cl.$^7$ ............................................. B32B 25/02
(52) U.S. Cl. ................. 428/295.1; 428/172; 428/171; 428/221; 428/374; 428/362; 428/369
(58) Field of Search ................. 428/171, 172, 428/221, 224, 225, 289, 359, 364, 374, 295.1, 295.4, 297.4, 332, 362, 369, 292.1

(56) References Cited

U.S. PATENT DOCUMENTS

| | | | |
|---|---|---|---|
| 2,638,457 A | | 5/1953 | Gates |
| 3,802,951 A | * | 4/1974 | Mitchell ................. 161/162 |
| 4,133,795 A | * | 1/1979 | Himes ................... 260/33.6 |
| 4,229,338 A | | 10/1980 | Hansen et al. |
| 4,434,518 A | | 3/1984 | Watanabe |
| 4,651,445 A | | 3/1987 | Hannibal |
| 4,777,738 A | | 10/1988 | Giese et al. |
| 4,923,454 A | | 5/1990 | Seymour et al. |
| 4,977,213 A | | 12/1990 | Giroud-Abel et al. |
| 5,025,573 A | | 6/1991 | Giese et al. |
| 5,150,905 A | | 9/1992 | Yuki et al. |
| 5,281,380 A | | 1/1994 | Umeda et al. |
| 5,572,805 A | | 11/1996 | Giese et al. |
| 5,575,089 A | | 11/1996 | Giese et al. |
| 5,624,994 A | | 4/1997 | Hert et al. |
| 5,896,680 A | | 4/1999 | Kim et al. |
| 5,906,872 A | | 5/1999 | Lyden et al. |
| 5,918,338 A | | 7/1999 | Wong |
| 5,966,840 A | | 10/1999 | Bell et al. |
| 5,987,782 A | | 11/1999 | Bramani |
| 6,032,388 A | | 3/2000 | Fram |
| 6,050,002 A | | 4/2000 | Meschan |
| 6,061,931 A | | 5/2000 | Kaneko |
| 6,100,328 A | | 8/2000 | Lopez Poy et al. |

* cited by examiner

*Primary Examiner*—Merrick Dixon
(74) *Attorney, Agent, or Firm*—Nathan Amitiai; Drahsion Limm; Soh Levine

(57) ABSTRACT

The present invention relates to a shoe sole that includes a polyamide in the form of powder or microfibers admixed with a thermoplastic base material to improve the strength, durability, abrasion resistance, and other desirable physical properties of the shoe sole. Suitable thermoplastic base materials include rubber, polyurethane or ethylene vinyl acetate. The polyamide microfibers are randomly and non-uniformly oriented to reinforce the shoe sole in all directions.

20 Claims, No Drawings

SHOE SOLE

RELATED APPLICATION

The present application claims the benefit of U.S. Provisional Application No. 60/245,541, filed Nov. 3, 2000.

FIELD OF THE INVENTION

The present invention relates to a shoe sole composition, and more particularly to an improved shoe sole composition made from at least one thermoplastic base material and an additive component such as polyamide microfibers, polyamide powder, or polyamide fibers in a homogenous or partly homogenous blend as will permit the selection of desired physical properties; a method of producing such a shoe sole, and a shoe having such a sole.

BACKGROUND OF THE INVENTION

In the footwear industry manufacturers have strived to make quality shoes for various activities including walking and athletics. Shoes are currently made using various compositions, constructions, and processing techniques. The type of materials used for each part of the shoe are important for creating a quality shoe. The materials used for the shoe sole are especially important. In fact, many attempts have been made and continue to be made in an effort to make an improved shoe sole.

Traditional shoe sole materials include ethylene vinyl acetate (EVA), polyurethane (PU), rubber, and leather. For example, shoe soles made from rubber compositions have included synthetic resins (U.S. Pat. No. 4,434,518) or finely divided inorganic material (U.S. Pat. No. 5,150,905). Other materials that have been used in shoe soles include synthetic and vulcanized elastomers joined with thermoplastics (U.S. Pat. No. 5,624,994); fiber reinforced elastic sheets using staples oriented in a particular direction (U.S. Pat. No. 5,281,380); and plasticizers incorporated into polyamide (U.S. Pat. No. 4,977,213). These shoe sole materials do not have the abrasion resistance, durability, and strength desired by consumers. While each particular shoe has certain advantages, consumers still desire a shoe with improved quality, and manufacturers desire a process for making such a shoe that is faster and less costly.

Accordingly, there is a need in the art for a shoe sole composition that has greater strength, durability, abrasion resistance, and other desirable properties such as skid resistance, flexibility, and comfort.

SUMMARY OF THE INVENTION

The present invention addresses this need by providing a shoe sole with improved properties such as strength, durability, abrasion resistance, etc. The shoe sole is comprised of a thermoplastic base material formed in the shape of the shoe sole and containing therein an additive component such as polyamide microfibers, polyamide powder, polyamide fibers or mixtures thereof.

The present invention further provides a process for manufacturing such a shoe sole which can be less expensive and time-consuming than previous methods.

The present invention further provides a shoe with improved strength, durability, and abrasion resistance, and a relatively long useful life. The shoe comprises an upper and a midsole or lower surface contacting sole made from the shoe sole described herein.

These and other features and advantages of the present invention will be readily apparent from the following detailed description of the invention, the scope of the invention being set out in the appended claims.

DETAILED DESCRIPTION OF THE PREFERRED EMBODIMENTS

The shoe sole of the present invention is comprised of a thermoplastic base material containing therein an additive component such as polyamide microfibers, polyamide powder, or a mixture thereof. It is preferable that the thermoplastic base material be the major component of the shoe sole for many reasons. For example, the thermoplastic base material is typically less expensive than other materials, is capable of retaining the additive component therein; and imparts desirable physical characteristics to the shoe sole including toughness and durability.

The thermoplastic base material typically may be at least one thermoplastic material, and preferably, the thermoplastic component is selected from the group consisting of ethylene vinyl acetate (EVA), rubber, and polyurethane (PU). The thermoplastic material may be present in an amount of about 0.1 to about 99.9 weight percent of the shoe sole composition. The thermoplastic base material may also include other materials such as polyesters, polyethylene based polymers, or polyvinyls.

Any synthetic or natural rubber may be mixed with the additive component. The rubber contains additional ingredients conventionally used in the rubber industry. For example, the rubber may include a pigment, a filler, accelerators, and cross-linkers. The manufacturing process and technology used are those known in the rubber industry.

The thermoplastic base material generally can hold the additive component within the shoe sole. The additive component may be present in an amount sufficient to resist abrasion of the shoe sole during use thereof. The additive component is preferably present in amount of about 0.5 to about 20 weight percent of the shoe sole, and preferably about 1 to about 15 weight percent, and more preferably less than about 5 weight percent.

The additive component may form a homogenous or partially homogenous mixture with the thermoplastic base material depending on the desired physical properties of the shoe sole.

It is preferred that the additive component be uniformly mixed with and contained within the thermoplastic base material. For example, when blended with rubber, EVA, or PU, the additive component is homogeneously mixed.

It is preferable that the additive component comprises at least one synthetic polymer such as a polyamide microfiber, polyamide powder, or a mixture thereof, preferably in the form of microfibers. Preferably, the polyamide is a nylon. The nylon may be any nylon, but preferred nylons include nylon 6, nylon 6,6, and nylon 12. Also, the nylon may be a substituted nylon such as substituted nylon 6, substituted nylon 6,6, or methyl substituted nylons. In addition to or as an alternative to a polyamide, a polyester in the form of microfibers or powder may be used in the additive component, preferably in the form of microfibers. A preferred polyester is polyethylene terephthalate.

The additive component may also include carbon fibers, as well as other synthetic polymers, or combinations thereof.

The microfibers in the additive component may have a random and nonuniform orientation and distribution in the thermoplastic base material thereby reinforcing and strengthening the composition in many or all directions. Also, the microfibers should be capable of being wetted by the thermoplastic base material which reinforces and strengthens the mixture of the thermoplastic base material and the additive component, and, thus, the shoe sole.

The microfibers are preferably of a predefined size and uniform cut. The diameters of the microfibers are preferably less than about 0.015 mm, and more preferably less than about 0.01 mm. The lengths of the microfibers are preferably about 0.05 mm to about 0.2 mm, and more preferably about 0.1 mm to about 0.15 mm. Most preferred values for the diameter and the length of the microfibers may be determined using a ratio of diameter to length of the microfibers. The ratio can preferably be about 1:10 to about 1:20, and more preferably about 1:15.

The microfibers may be commercially purchased or prepared by known methods. For example, the preparation of Nylon-6 or Nylon 6,6 fibers is well known to one of ordinary skill in the art (see Kirk-Othmer, Encyclopedia of Chemical Technology, vol. 19, $4^{th}$ ed., pp. 529–30). Also, commercially available microfibers can be purchased and then cut to the desired length range.

In addition to microfibers, the additive component can also be in the form of powder. The powder particles can be any size or shape. Fine powder is preferred. The powder may be used as a complementary component or a filler.

The shoe sole may further include a binding agent in an amount sufficient to assist in retaining the additive component in admixture with the thermoplastic base material. The shoe sole composition may also contain fillers, additives, pigments, carbon fibers, cross-linkers, and any other materials.

The components of the shoe sole may be mixed in any manner. In particular, the components may be combined by processes known in the art with melt blending being preferred. During the manufacturing process, the components could be heated to a temperature that is below or above the melting point of the polyamide depending on the desired physical properties. The microfibers generally have increased viscosity during processing, making it difficult to orient them. Thus, melting the components of the shoe sole below the melting or softening point of the microfibers that are present creates a nonuniform dispersion. Such a dispersion is useful when greater reinforcement is desired.

The components may be mixed in a manner which permits homogenization or partial homogenization. A homogenous mixture results when the shoe sole components are processed above the melting point of the additive component, and a partly homogenous mixture results when the shoe sole components are processed below the melting point of the additive component. By adjusting the quantities of the components and the temperature at which the components of the shoe sole are processed, the physical properties of the shoe sole may be manipulated. For example, heating the components above the melting point of the additive component to form a homogenous mixture may result in a stronger composition, whereas heating the components to a temperature below the melting point of the additive component to form a partially homogenous mixture may result in a softer composition.

The admixture of the components may be formed into the shape of a shoe sole or parts of a shoe sole by using any suitable method including conventional injection molding, transfer molding, extrusion apparatus, or the like.

The admixture can be used on any part of any type of a shoe. The admixture is preferably used on the sole of a shoe. The shoe sole is typically attached to an upper. The foot of a wearer can be received and secured within the upper with the bottom of the foot resting on the shoe sole. The shoe sole of the present invention can include a midsole which is provided between a lower surface contacting sole and the upper, to provide cushioning to the foot of the wearer. The shoe sole of the present invention may be used for the lower surface contacting sole, the midsole, both, or portions of either one. The shoe sole is preferably used to form the lower surface contacting sole. The lower surface contacting sole may be integrally molded, glued, ultrasonically welded, or attached to other layers of the sole by any other known method. The shoe sole may be bonded to the shoe upper by injection molding or any other method known in the art.

The present invention results in improved physical characteristics of a shoe sole including abrasion resistance, hardness, flexibility, pulling, oil resistance, and static or skid resistance.

It will be appreciated features described with respect to one embodiment typically may be applied to another embodiment, whether or not explicitly indicated. The various features hereinafter described may be used singly or in any combination thereof Therefore, the present invention is not limited to only the embodiments specifically described herein.

While the foregoing description represents the preferred embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. One skilled in the art will appreciate that the invention may be used with many modifications of structure, arrangement, proportions, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims, and not limited to the foregoing description.

What is claimed is:

1. A shoe sole comprising, a thermoplastic base material formed in the shape of the shoe sole and containing therein an additive component comprising polyamide microfibers, polyamide powder, or mixtures thereof, wherein the additive component is present in an amount of about 0.5 to about 20 weight percent of the shoe sole.

2. The shoe sole of claim 1 wherein the additive component comprises polyamide microfibers.

3. The shoe sole of claim 1 wherein the polyamide microfibers are present in an amount of less than 5 weight percent of the shoe sole.

4. The shoe sole of claim 1 wherein the additive component comprises polyamide microfibers having a length of about 0.05 mm to about 0.2 mm and a diameter of less than about 0.015 mm.

5. The shoe sole of claim 3 wherein the polyamide microfibers have a random orientation.

6. The shoe sole of claim 1 wherein the thermoplastic base material is selected from the group consisting of polyurethane, rubber, and ethylene vinyl acetate.

7. The shoe sole of claim 1 further comprising a binding agent in an amount sufficient to assist in retaining the additive component in admixture with the thermoplastic base material.

8. The shoe sole of claim 1 wherein the thermoplastic base material and the additive component contained therein are homogenously or partially homogenously blended.

9. A shoe comprising an upper and the shoe sole of claim 1 as a midsole.

10. A shoe comprising an upper and the shoe sole of claim 1 as a lower, surface contacting sole.

11. A process for making a shoe sole comprising a thermoplastic base material and an additive component mixed therein, the process comprising, admixing at least one thermoplastic base material and an additive component comprising polyamide microfibers, polyamide powder, or mixtures thereof, wherein the additive component is present in an amount of about 0.5 to about 20 weight percent of the shoe sole; heating the admixture of the thermoplastic base material and the additive component; and forming the admixture in the shape of a shoe sole.

12. The process of claim 11 wherein the admixture is heated to a temperature below the melting point of the additive component to form a partially homogenous blend.

13. The process of claim 11 wherein the admixture is heated to a temperature above the melting point of the additive component to form a homogenous blend.

14. The process of claim 11 further comprising adjusting the temperature and the quantities of the thermoplastic base material and the additive component to obtain desired physical properties of the shoe sole.

15. A shoe sole comprising, a thermoplastic base material formed in the shape of the shoe sole and polyamide microfibers contained in the thermoplastic base material, wherein the polyamide microfibers are present in an amount of about 0.5 to about 20 weight percent of the shoe sole, and the polyamide microfibers have a length of about 0.05 mm to about 0.2 mm and a diameter of less than about 0.015 mm.

16. The shoe sole of claim 15 wherein the polyamide microfibers have a length of about 0.1 mm to about 0.15 mm.

17. The shoe sole of claim 15 wherein the polyamide microfibers are present in an amount of less than 5 weight percent of the shoe sole.

18. The shoe sole of claim 15 wherein the polyamide microfibers have a random orientation.

19. The shoe sole of claim 15 further comprising a binding agent in an amount sufficient to assist in retaining the polyamide microfibers in admixture with the thermoplastic base material.

20. The shoe sole of claim 15 wherein the thermoplastic base material and the polyamide microfibers are homogenously or partially homogenously blended.

* * * * *